United States Patent [19]

Papworth et al.

[11] Patent Number: 5,404,473

[45] Date of Patent: Apr. 4, 1995

[54] APPARATUS AND METHOD FOR HANDLING STRING OPERATIONS IN A PIPELINED PROCESSOR

[75] Inventors: David B. Papworth, Beaverton; Michael A. Fetterman; Andrew F. Glew, both of Hillsboro; Lawrence O. Smith, III, Beaverton; Michael M. Hancock, Portland; Beth Schultz, Tualatin, all of Oreg.

[73] Assignee: Intel Corporation, Santa Clara, Calif.

[21] Appl. No.: 204,612

[22] Filed: Mar. 1, 1994

[51] Int. Cl.6 .............................................. G06F 13/00
[52] U.S. Cl. .............................. 395/375; 364/DIG. 1; 364/DIG. 2
[58] Field of Search ...................... 395/375, 700, 800

[56] References Cited

U.S. PATENT DOCUMENTS

| | | | |
|---|---|---|---|
| 4,882,701 | 11/1989 | Ishii | 395/375 |
| 5,056,004 | 10/1991 | Ohde et al. | 395/375 |
| 5,101,484 | 3/1992 | Kohn | 395/375 |
| 5,265,253 | 11/1993 | Yamada | 395/700 |
| 5,303,355 | 4/1994 | Gergen et al. | 395/375 |

*Primary Examiner*—Robert B. Harrell
*Assistant Examiner*—Ted M. Wolfe
*Attorney, Agent, or Firm*—Blakely, Sokoloff, Taylor & Zafman

[57] ABSTRACT

In a pipelined processor, an apparatus for handling string operations. When a string operation is received by the processor, the length of the string as specified by the programmer is stored in a register. Next, an instruction sequencer issues an instruction that computes the register value minus a pre-determined number of iterations to be issued into the pipeline. Following the instruction, the pre-determined number of iterations are issued to the pipeline. When the instruction returns with the calculated number, the instruction sequencer then knows exactly how many iterations should be executed. Any extra iterations that had initially been issued are canceled by the execution unit, and additional iterations are issued as necessary. A loop counter in the instruction sequencer is used to track the number of iterations.

37 Claims, 5 Drawing Sheets

APPARATUS AND METHOD FOR HANDLING STRING OPERATIONS IN A PIPELINED PROCESSOR

FIELD OF THE INVENTION

The present invention pertains to the field of pipelined processors. More particularly, the present invention relates to an apparatus and method for handling move string operations in a pipelined processor.

BACKGROUND OF THE INVENTION

The function of a microprocessor is to execute programs. Programs comprise a group of instructions. In a conventional unpipelined processor, the instruction is first fetched. Next, the instruction is decoded. Its register or memory references are then determined, and the operands are fetched from those sources. When all operands are ready, the execution unit performs the desired operation on these operands. Finally, the result is stored in the specified location when the execution completes. Thereupon, execution of the next instruction begins.

Processor performance can be improved by reducing the time it takes to execute a program. One technique for increasing the performance involves using a technique known as "pipelining". Pipelining is a well-known mechanism for extracting useful concurrency from a program's execution. This is accomplished by taking advantage of the various stages instructions pass through. The key to pipelining is that at any given phase of the instruction's execution lifetime, it is making use of only a few of the processor's many resources (e.g., instruction cache, fetching, decoding, register lookups, memory reads, execution unit operations, destination writes, etc.). Moreover, each instruction tends to make use of these resources in the same sequence.

Hence, in a pipelined processor, each step of a pipeline completes a portion of the execution of an instruction. Each of the steps in the pipeline is called a pipe stage. The pipe stages are separated by clocked registers or latches. The steps required to execute an instruction are executed independently in different pipeline stages, provided that there is a dedicated part of the processor for each pipe stage. The result of each pipeline stage is communicated to the next pipeline stage via the register between the stages. It should be noted that although pipelining does not decrease the total amount of time required to execute an instruction, it does minimize the average number of cycles required to execute a program by permitting the processor to handle more than one instruction at a time. Furthermore, superscalar processors issue multiple instructions at a time. In this manner, a processor with multiple execution units can execute multiple instructions concurrently. This type of superscalar processor performs concurrent execution of instructions in the same pipeline stage, as well as concurrent execution of instructions in different pipeline stages.

It is natural to assume that as the pipeline is made deeper by implementing more stages, that the processor's performance would be enhanced. This statement is true, up to a certain point. For digital signal processors, such as compact disc players, extremely deep (e.g., 100+ stages) pipelines work fine. However, for general purpose processors, deep pipelines suffer from branching effects.

When a branch in the computer program is encountered, it is first fetched and decoded. Then, its operands are determined and executed. Next, its result is written back. At that point, four clock cycles have already been expended on the branch's successor instruction because it is pipelined along, same as any other following instruction. If the successor to the branch does not directly follow the branch in the program's source code, all of the partly-completed work in the pipeline behind the branch is erroneous and must be discarded. In other words, due to the fact that pipelined processors fetch the next instruction before they have completely executed the previous instruction, the next instruction fetch could have been to the wrong place if the previous instruction were a branch. The deeper the pipeline, the more partly-completed work that must be discarded and restarted.

One example where branches are encountered involves the use of string operations. Virtually all computer programs include strings. A string is a collection or set of characters stored continuously in memory in a particular sequence. To move or otherwise manipulate a string, the processor iterates over a number of elements of the string. In other words, the processor "loops" through a number of iterations over the length of the string. When a program loops, there must be a mechanism to bring the execution path out of the loop at the proper time. One method for halting execution of the loop entails predicting, at the end of each loop iteration, whether the loop is to be repeated. However, if the prediction is wrong, it can take a long time to recover from the misprediction, especially for those processors having a deep pipeline. The penalty associated with a branch misprediction for long strings does not seriously impact performance. However, the strings found in most programs are of short or medium length. The performance degradation incurred with branch mispredictions in these cases can be quite severe.

Thus, there is a need in the prior art for handling string operations in a processor having a pipelined architecture without relying on branch predictions.

SUMMARY OF THE INVENTION

The present invention pertains to an apparatus and method for handling string operations in a pipelined processor. A string operation loops through a number of iterations. When an operation performs loops, there must be a mechanism to bring the execution path out of the loop at the proper time. In the currently preferred embodiment, the number of loops to be performed by a string operation is stored in the ECX register. Rather than performing a branch prediction at the end of each loop to determine whether to execute another loop or to stop looping, the present invention initially issues a number of loop interations and adjusts. As a result, a conditional branch is not required at the end of each iteration. Thereby, the present invention eliminates the need for branch predictions and any attendant mispredictions, associated with string operations.

The microinstruction sequencer (MS) is used to issue the loop iterations. The MS is placed father early in the pipeline. However, the value of the ECX register is not available until late in the pipeline. Hence, the value in the ECX register is not yet known at the beginning of the string instruction. The dual dilemmas of how many loop iterations to issue before knowing the value of the ECX register, and only executing loop iterations called for in the program are resolved by using conditional execution and by implementing an MS Loop Counter in the MS.

In the present invention, the MS initially issues a predetermined number, n, of special "unrolled" iteration loops into the pipeline in response to receiving a string operation. These special unrolled interation loops are conditionally executed, depending on the ECX value in the pipe stages where the ECX value is known. By the time these unrolled loops have been issued by the MS into the pipeline, the ECX-n value is returned to the MS. The ECX-n value is returned to the MS with a valid/not valid status. The MS Loop Counter status is then checked to determine whether additional loops are to be issued. Additional iterations are allowed if the MS Loop Counter value is greater than zero. From that point forward, each executed loop iteration checks and decrements the MS Loop Counter value at the MS stage in the pipeline. If it is determined that more loop iterations were initially issued than are actually needed (n>ECX), the execution unit does not execute the extra un-needed loop iterations. If the ECX-n value happens to be zero, this indicates that the initial number of unrolled loop iterations that were issued by the MS happened to be correct. All of those unrolled loop iterations are executed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for handling string operations in a pipelined processor is described. In the following description, for purposes of explanation, numerous specific details are set forth, such as microinstructions, registers, iterations, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. It should be noted that the present invention may be applied to a variety of different processor architectures.

Figure 1:
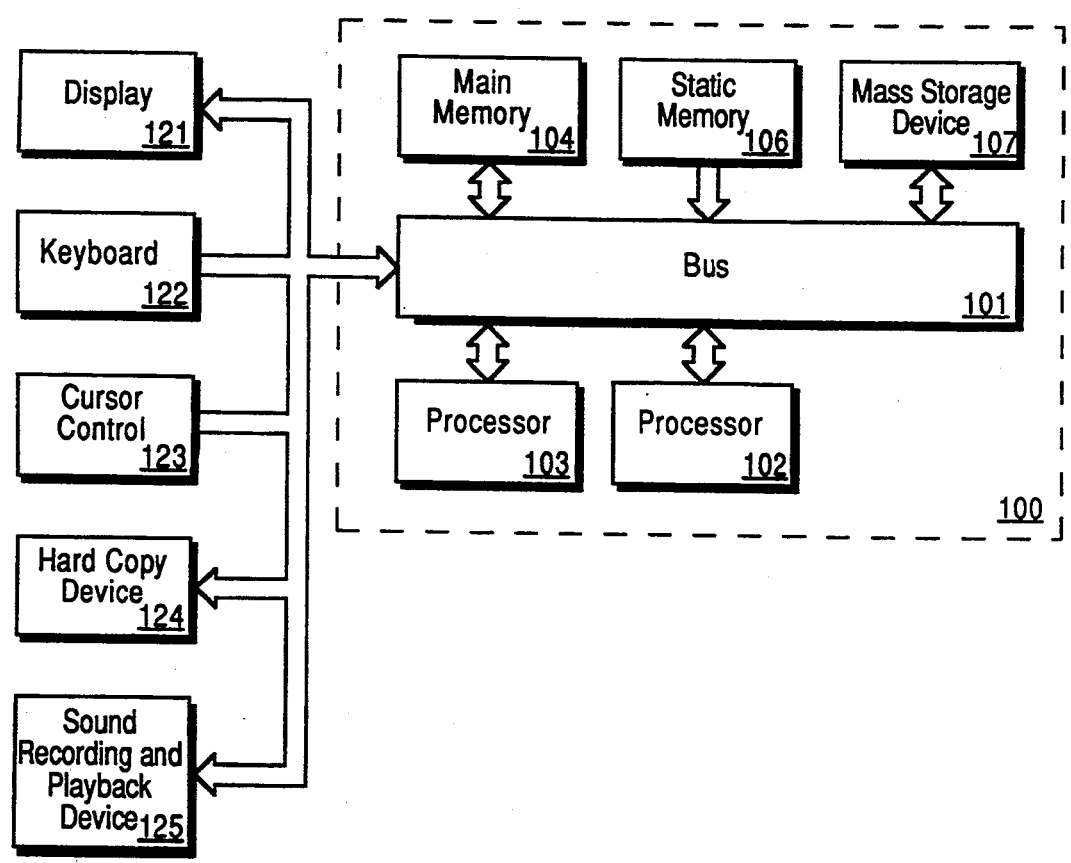
FIG. 1 shows the computer system upon which a preferred embodiment of the present invention is implemented.

Referring now to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as the Intel TM architecture microprocessors, PowerPC TM, Alpha TM, etc. Additional numbers of processors, such as processor 103, may also be coupled to bus 101. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
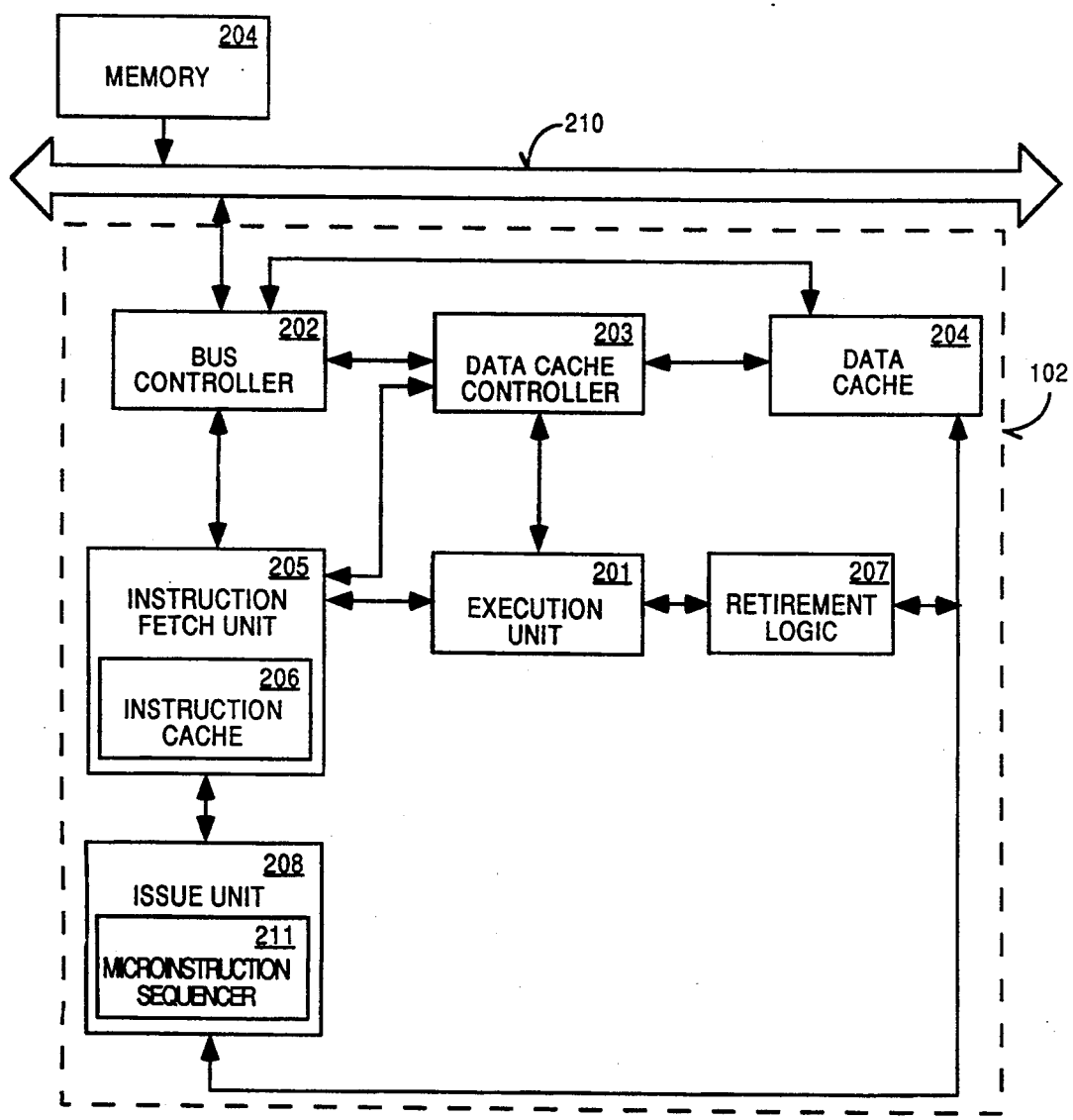
FIG. 2 is a block diagram illustrating an exemplary processor incorporating the teachings of the present invention.

FIG. 2 is a block diagram illustrating an exemplary processor 200 incorporating the teachings of the present invention is shown. The exemplary processor 200 comprises an execution unit 201, an external bus logic controller 202, a data cache controller 203, a data cache 204, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch unit 205 fetches instructions from instruction cache 206 and on a cache miss from an external memory through the bus controller 202 via an external system bus. Bus controller 202 manages transfers of data between external components and processor 200. In addition, it also manages cache coherency transfers. The issue unit 211 then issues these instructions to the execution unit 201 in an in-order sequence. Included within issue unit 208 is the microinstruction sequencer (MS) 211. The primary purpose of the microinstruction sequencer 211 is to source microinstructions for event handling or complex instructions. The MS performs its work in one of the pipestages. During each cycle for which it is busy, the MS generates a microinstruction pointer; uses this pointer to access the microinstruction read only memory (ROM), and read out micro operations; decodes the micro operations and forms control signals for the next cycle. Basically, the execution unit 201 performs such functions as add, subtract, logical AND, and integer multiply. Some of these instructions are fetched and issued speculatively. The execution unit 201 holds and executes the integer and floating point instructions when their operand dependencies on execution results of preceding instructions are resolved. This includes those integer and floating point instructions that are speculatively fetched and issued. In similar fashion, the execution unit 201 holds and forwards the load and store instructions to the retirement logic 207. Furthermore, execution unit 201 has the capability of performing conditional executions, whereby a particular microinstruction is either executed or not executed, depending upon whether a specified condition is fulfilled.

Retirement logic 207 commits the states of these instructions to whatever permanent architectural state that was designated by the original source code. Load instruction execution requires data from the actual memory location. Hence loads are retired only after the data becomes available from the local buffers, caches or memory as necessary.

External snoops do not recognize the existence of the store. "Snooping" refers to the act of monitoring data and address traffic for values of interest. If a processor writes memory to an address that is in the local cache, that cache will have been snooping the memory bus and will notice that it now has a stale copy of that data. That cache entry will then be invalidated. The next time that cache entry is accessed, instead of retrieving outdated data, it will incur a cache miss, and the new data will be forwarded from memory.

Data cache controller 203 controls the access of data to/from the data cache 204. Data cache 204 is a fast, small, hardware-maintained scratchpad memory which can be reached in fewer clock cycles than main memory by loads and stores. The execution unit forwards load instructions immediately to the data cache controller 203 and the data cache 204. This is because a load instruction cannot retire until the data is available from the cache or memory subsystem. In contrast, store instructions are buffered. In other words, memory references are not necessarily forwarded in the order they were issued. Moreover, some memory load references are forwarded due to speculative execution of instructions. In any case, the execution results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores of mis-predicted branches are purged.

The instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

Figure 3:
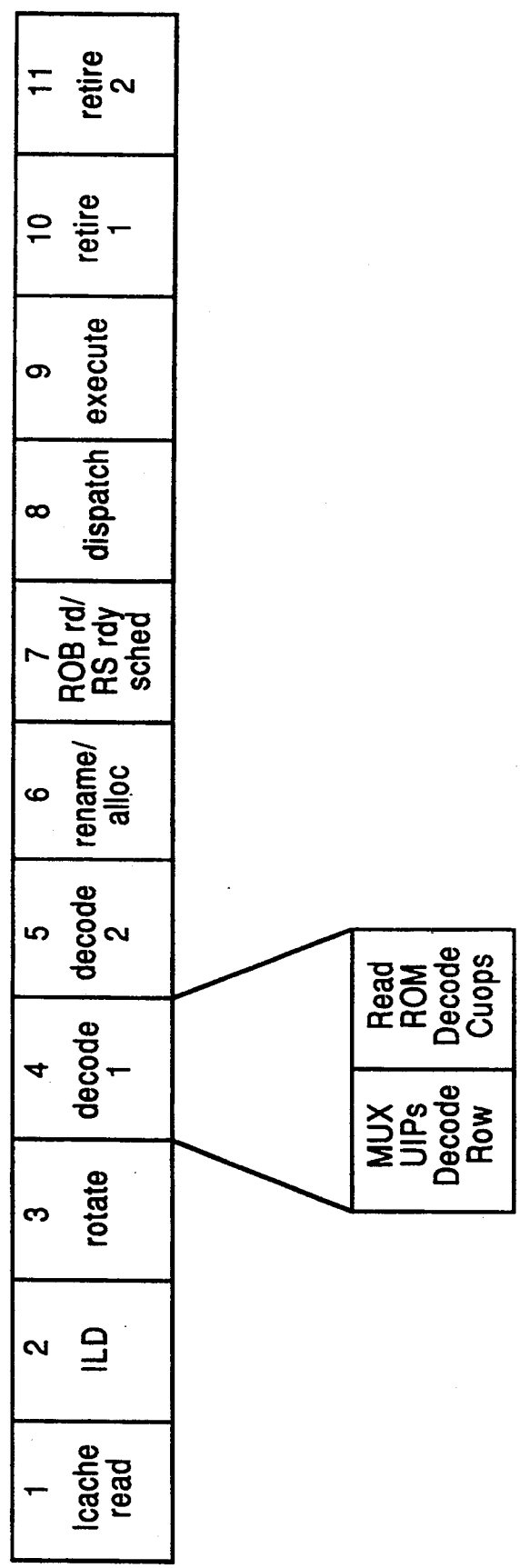
FIG. 3 illustrates a set of pipeline stages that define a deeply pipelined processor configured in accordance with one embodiment of the present invention.

FIG. 3 illustrates a set of pipeline stages that define a deeply pipelined processor configured in accordance with one embodiment of the present invention. In the instruction pipeline of FIG. 3, the instruction processing is divided into 11 pipeline stages. A brief description of each of the pipestages follows. In general, the first three pipestages are dedicated to the processor fetch operation. During pipestage 1, the instruction fetch unit executes an instruction cache look-up to fetch a macro instruction for processing. During pipestage 2, the instruction fetch unit performs instruction length decoding by marking the macro instructions appropriately. During pipestage 3, the instruction fetch unit rotates the macro instructions based on the fetch instruction pointer and the number of instructions consumed by the instruction decoder. The decode functions are executed during pipestages 4 and 5. In particular, the MS operates in the first decode pipestage. During each cycle that the MS is summoned, the MS generates a micro instruction pointer, and utilizes the micro instruction pointer to access the micro ROM and read out micro-ops. In addition, the MS decodes the micro-ops and forms control signals for the next cycle.

In pipestage 6, the register rename function is performed. In addition, resources are assigned. During pipestage 7, sources are read and data ready micro-ops are scheduled for dispatch to available execution units. During pipestage 8, micro-ops are dispatched to the appropriate execution units. During pipestage 9, the execution units execute the micro-ops dispatched. During pipestages 10 and 11, a two stage retirement function is executed, thereby completing the high level pipeline stages.

Since the pipeline is long (e.g., 11 stages) compared to traditional processors (e.g., 5 stages), recoveries from branch mispredictions are costly in terms of time. A Branch Target Buffer is used to predict branches based on past history. However, the path of a program can change for other reasons. For example, the repeat move string (REP MOVS) macro instruction loops through a number of iterations. When a program loops, there must be a mechanism to bring the execution path out of the loop at the proper time. In the currently preferred embodiment, a loop count is stored in a register. More specifically, the number of loops to be performed by a REP MOVS macro instruction is stored in the ECX register. Rather than performing a branch prediction at the end of each loop to determine whether to execute another loop or to stop looping, the present invention executes a number of loop iterations exactly equal to the value in the ECX register. As a result, a conditional branch is not required at the end of each iteration. Thereby, the present invention eliminates the need for branch predictions and any attendant mispredictions, associated with string operations.

The unit that issues loop iterations is the microinstruction sequencer. As described above, the MS is placed rather early in the pipeline (pipe stage 4). However, the value of the ECX register is not available until late in the pipeline (e.g., pipe stage 11). Hence, the value in the ECX register is not yet known at the beginning of the string instruction. In other words, the internal timing of the pipelined processor is such that the value that the user programmer has stored in the ECX register to specify the number of loop iterations, is not necessarily resolved until late in the pipeline. Yet, the MS is placed earlier in the pipeline. The dilemmas are to how many loop iterations to issue before the value of the ECX register is resolved and only executing the correct number of loops specified by the macro instructions.

In the present invention, the MS initially issues a predetermined number, n, of special "unrolled" iteration loops into the pipeline in response to receiving a string operation. These special unrolled interation loops are conditionally executed, depending on the ECX value in a stage of the pipe where ECX is resolved. By the time these unrolled loops have been issued by the MS, the ECX-n value is returned. Since execution occurs in the back end of the pipeline, at the same place that the ECX value is known, each time a microinstruction in one of these unrolled loop iterations is to be executed, the ECX value is checked to determine whether that particular loop iteration is to be allowed. A particular loop iteration is allowed if the ECX value is greater than zero. Each conditionally executed loop iteration decrements the ECX value. This current ECX value is passed on to the next loop iteration for determining whether that next loop iteration is to be conditionally executed. Thus, if the ECX value specified by the programmer is actually less than the number of iterations initially issued by the MS, the extra un-needed iterations are not executed.

The MS Loop Counter is manipulated by the microcode with the following microinstructions: Load MS Loop Counter, Decrement MS Loop Counter, and Jump on MS Loop Counter value. The Load MS Loop Counter executed by the execution unit, loads the loop counter with the value of the ECX register minus the predetermined number at unrolled loops "n" (ECX-n). The microcode causes a read of the ECX register, performs a general subtraction, stores the result as a temporary and issues it as an operand. Next, the MS issues the number of n unrolled loop interations into the pipeline. Note that the Load MS Loop Counter instruction for forwarding to the MS ECX-n is issued before the unrolled loop iterations are issued. Once the ECX-n value is computed, the executed unit determines whether the ECX-n value is less than zero and forwards this information to the MS. If so, the Jump on MS Loop Counter microinstruction jumps to a termination routine in the microcode to halt that string operation. The ECX value is forwarded from the back end to the front end. Thereupon, the MS starts execution on the next instruction. Furthermore, the execution unit determines which of the unrolled loop iterations that were initially issued are to be executed. This determination is based on a loop iteration's ECX compared to zero. If ECX=0 for a loop iteration, that iteration is not executed and is changed into a null operation. Each conditional loop iteration decrements ECX by one and forwards that to the next loop iteration.

If the ECX-n value happens to be zero, this indicates that the initial number of unrolled loop iterations that were issued by the MS happened to be correct. All of those unrolled loop iterations are executed. The Jump on MS Loop Counter microinstruction jumps to a termination routine in the microcode to halt the string operation.

If the ECX-n value is greater than zero, a main loop routine is performed. In the main loop routine, an MS Jump first checks the value of the MS Loop Counter for string termination and then the decrement Loop Counter microinstruction decrements the MS Loop Counter value. These get executed at the front end of the pipeline by the MS, rather than the Execution Unit. The next loop iteration is then issued and executed. This process is repeated until the Loop Counter value becomes zero. Thereupon, the MS Jump microinstruction jumps to a termination routine in the microcode to halt the string operation.

Figure 4:
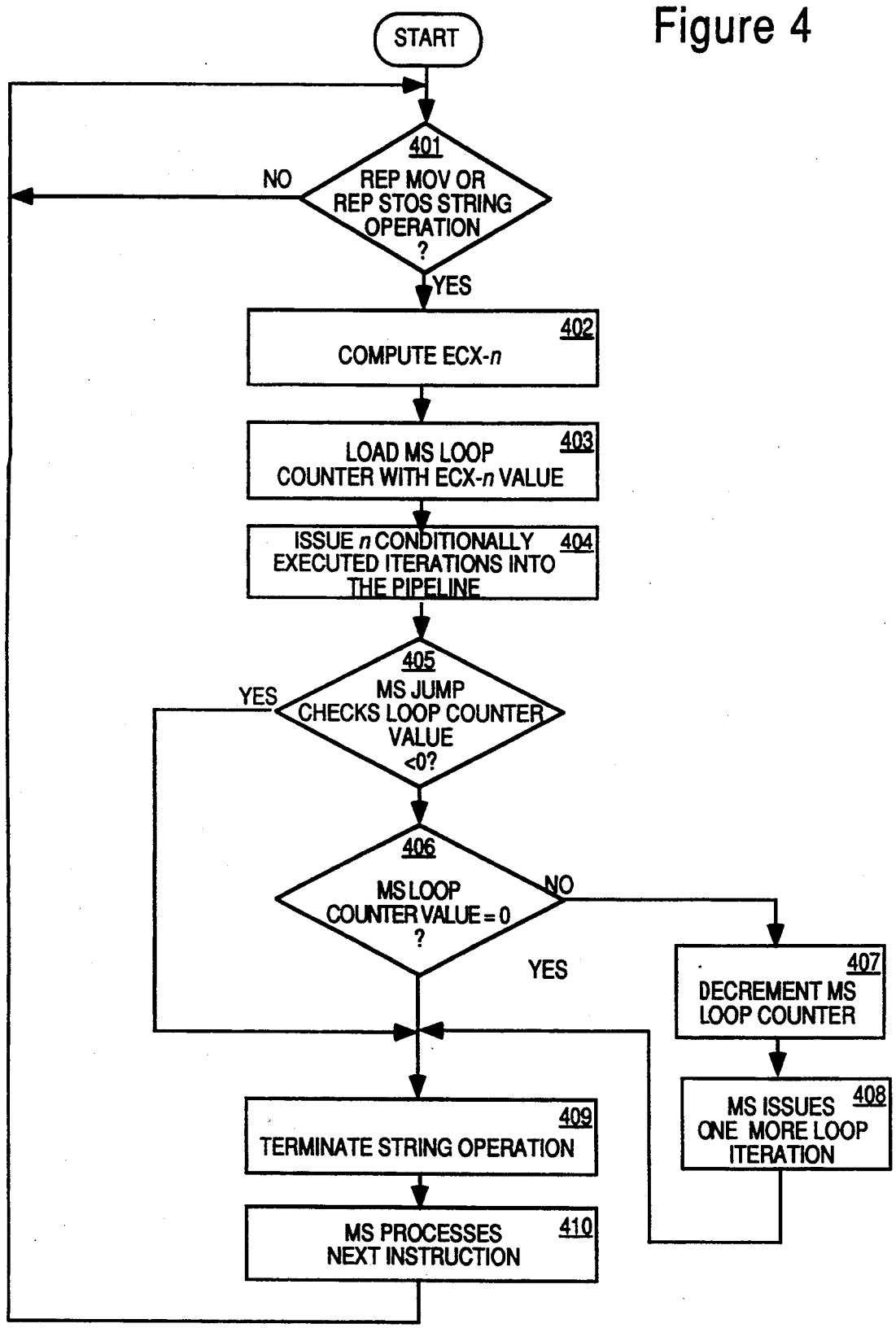
FIG. 4 shows a flowchart describing the steps for performing a string operation for the currently preferred embodiment of the present invention.

FIG. 4 shows a flowchart describing the steps for performing a string operation for the currently preferred embodiment of the present invention. Initially, a determination is made as to whether a microinstruction involves a REP MOVS or REP STOS string operation, step 401. If a string operation is involved, a microinstruction to compute the value of ECX-n is issued to the pipeline, step 402. When the ECX-n value has been executed, this value is loaded into the MS Loop Counter, step 403. Next, the MS issues n number of conditionally executed loop iterations into the pipeline, step 404.

The MS Jump checks to determine whether the Loop Counter value is less than or equal to zero, step 405. If the Loop Counter value is greater than zero, steps 406-408 are performed. Otherwise, the string operation is terminated, step 409. And the MS processes the next instruction, step 410. In step 406, a determination is made as to whether the MS Loop Counter value equals zero. If so, the flow progresses to step 409. Otherwise, the MS Loop Counter is decremented by one, step 407. Next, the MS issues one more loop iteration, step 408. The flow then progresses to step 409.

In the currently preferred embodiment, seven unrolled loop iterations are initially issued by the MS. Seven unrolled loop iterations are initially issued because there are approximately seven pipe stages between the MS and execution stages. In other words, there are approximately seven clock cycles between when the MS first gets control of the string operation and when the ECX value becomes available. Consequently, after seven unrolled loop iterations have been issued into the pipeline, the ECX-n data specifying the actual string length is received by the MS from the execution unit at the next clock cycle. It should be noted that the optimal number of unrolled loop iterations initially issued varies, depending on the depth of the pipeline and other performance criteria.

An example is now offered to demonstrate how a string operation is processed. Supposing that the string length is four characters. The ECX register will be loaded with the value four. A microinstruction that subtracts n from ECX is issued and then the MS issues a Load MS Loop Counter microinstruction into the pipeline that will forward the value of ECX-n from the execution unit back to the MS. Next, the MS issues seven unrolled loop iterations into the pipeline. As these seven unrolled loop iterations are being issued, the execution unit is processing the Load MS Loop Counter microinstruction to forward the value of ECX-7. In this example, ECX-7=4−7=−3. This indicates that three extra unrolled loop iterations were issued than were necessary. When these three extra unrolled loop iterations reach the execution pipe stage, the execution unit execute them as a null instruction. Instead of having to recover from a branch misprediction by discarding the entire pipeline and then restarting, the present invention only discards those three superfluous loop iterations.

In a second example, if the character string happens to be seven characters in length, the correct number of unrolled loop iterations were issued. Hence, these unrolled loop iterations are all executed. None are executed as null instructions. Thereafter, the MS can proceed to process the next instruction.

In a third example, assume that the character string is nine characters in length. The ECX register will be loaded with the value nine. A microinstruction that subtracts 7 from 9 is issued into the pipeline. Then the MS issues a Load MS Loop Counter microinstruction into the pipeline that forwards the result of (9−7) from the execution unit back to the MS. Next, the MS issues seven unrolled loop iterations into the pipeline. As these seven unrolled loop iterations are being issued, the execution unit is processing the Load MS Loop Counter microinstruction to forward the value of ECX-7. In this example, ECX-7=9−7=+2. The Loop Counter is loaded with the value of +2. This indicates that two more loop iterations need to be issued in addition to the seven initially issued unrolled loop interations. Via the MS Jump microinstructions, the current Loop Counter value (+2) is checked. The Loop Counter is decremented by one and then the MS issues one more loop iteration into the pipeline. The current Loop Counter value now becomes +1. The MS Jump detects again that since +1 is greater than zero, the Loop Counter is decremented again and then the MS issues another loop iteration. The MS Jump microinstruction now detects that the Loop Counter value is zero. Thus, the MS jumps to a termination routine which terminates the string operation.

Figure 5:
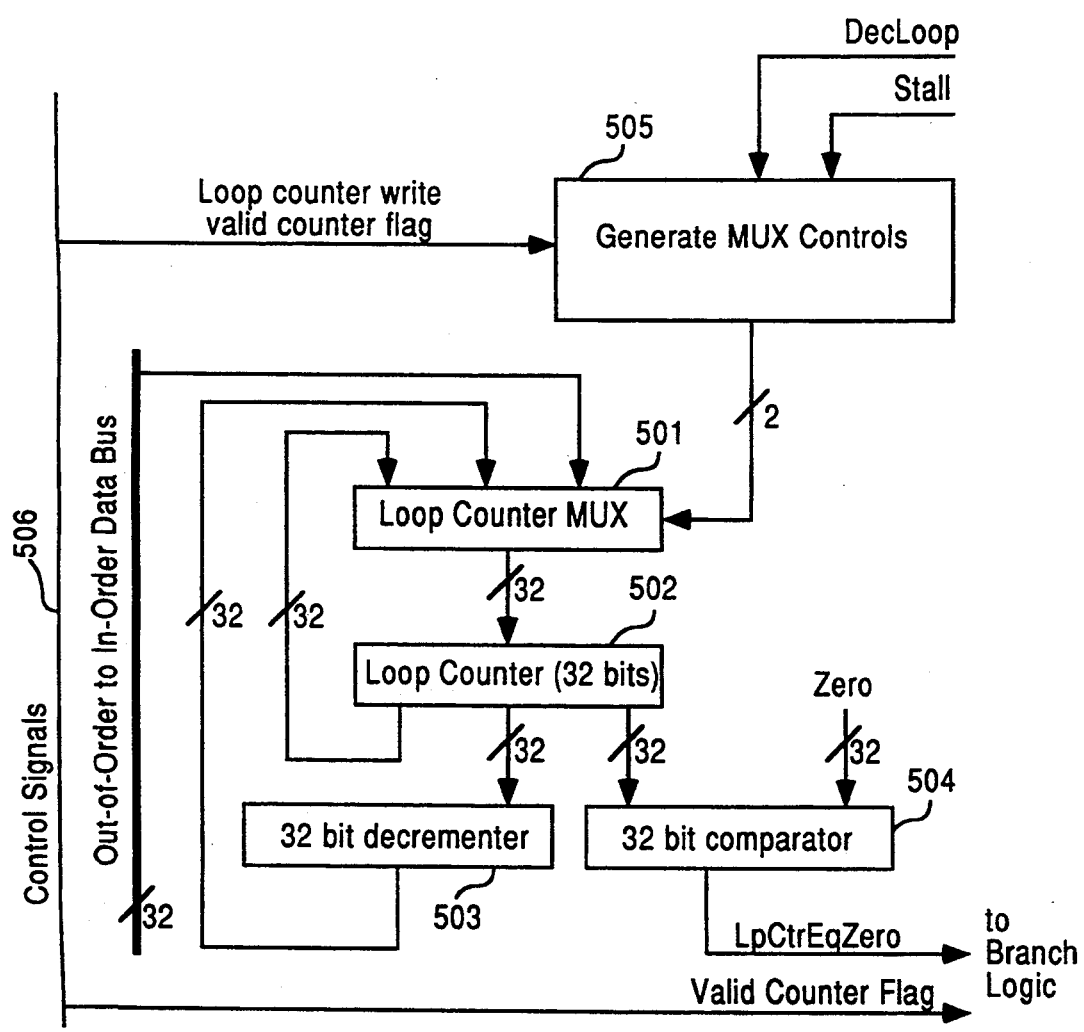
FIG. 5 shows a block diagram of the MS Loop Counter.

FIG. 5 shows a block diagram of the MS Loop Counter. The MS contains Loop Counter logic 501-505 to optimize the execution of short string operations with a REP prefix. The CX register is used if the address size is 16 and the ECX register is used if the address size is 32. In the following description, (E)CX denotes the CX or ECX register. In the currently preferred embodiment, the MS contains a Loop Counter 502. One of the first Cuops in a REP swing operation loads the MS Loop Counter 502 with the number of iterations remaining after the unrolled iterations are executed. Cuops are the operations executed internal to the processor. Swings are unrolled in the microcode so that Cuops for a small number of iterations (e.g., seven), are sent during the time it takes for the Loop Counter 502 in the MS to be loaded. This unrolled code is executed conditionally based on the value of (E)CX. For example, if (E)CX is four when the string operation is started, only four iterations are executed and the conditional Cuops for the remaining three iterations are turned into NOPs.

If the (E)CX value is greater than the number of unrolled iterations, the microcode goes into a loop which sequences based on the value in the MS Loop Counter 502. If the Loop Counter 502 has not been loaded by the time the MS reaches code dependent upon it, the MS will stall and invalidate Cuops until the Loop Counter 502 is loaded. The stalling capability is a feature of the MS Jump microinstruction. The number of iterations unrolled and conditionally executed is chosen so that in most cases Loop Counter 502 will be loaded before it is needed. This scheme allows some amount of work to be done while the MS is waiting for the value of (E)CX to be loaded to its Loop Counter 502.

Once the Loop Counter 502 has been loaded, the MS knows exactly how many more iterations to do. The microcode loop contains a Cuop MISDECLP to decrement the MS Loop Counter. A 32-bit decrementer 503 decrements the Loop Counter 502 in response to a MISDECLP Cuop. Furthermore, a MISJMP Cuop is issued to exit the loop when the counter equals zero. A 32-bit comparator 504 outputs a LpCtrEqZero signal to indicate that the value in Loop Counter 502 is zero. This condition is checked by the MISJMP Cuop to be a taken branch. These Cuops are executed by the MS at the time they are read out of the UROMs; but they are still issued from the instruction decode unit, travel through the pipe and retire. The sequencing of repeat string operations is under control of the MS, allowing string operations to complete without the performance hit of a branch mispredict.

In the microcode for a REP string operation, the first Cuop subtracts the number of unrolled iterations from the original value in (E)CX. The next Cuop sends that result to the MS. In addition to the result value, a valid flag is sent so that the MS can tell if the value is a large positive number or a negative number. For example, if EXC was four when the string operation was started, the first Cuop would subtract seven from four, the result would be FFFFFFFD hex, and the carry/borrow flag would be set. Because the x86 architecture specifies that the ECX value is to be treated as an unsigned number, the MS cannot just look at the most significant bit and treat it as a sign bit. It is a legal x86 instruction to move FFFFFFFD string characters. Consequently, a valid flag, the NOT of the carry flag from the subtract operation is sent to inform the MS as to whether it should interpret the value on the control bus 506 as a valid large positive number or as a negative number. If the valid flag is hot set, the MS knows that the original (E)CX value was less than or equal to the number or unrolled iterations, and the subtraction produced a negative number. When the MS loads the value into the Loop Counter, it also latches the valid bit. The MS uses this bit when executing the MISJMP Cuop in every loop iteration. The MS will exit from the string loop at the MISJMP Cuop if the Loop Counter is zero or if the valid bit is not set. It should be noted that the data-dependencies on ECX mean that no instructions can be executed until ECX is available (i.e., it saves a few pipestages).

If a string operation of the variety REPE/Z SCAS, REPNE/NZ SCAS, REPE/Z CMPS, REPNE/NZ CMF, the string operation may be terminated before the Loop Counter is zero due to a detected relationship between corresponding elements of two strings or a character and a string. In this case, a conditional microbranch Cuop will be placed in the loop to explicitly test for the equal/not equal relationship and jump out of the loop if the condition has been met. The branch Cuop is predicted not taken so that the MS continues to stay in the loop until the MS Loop Counter is zero or a conditional branch Cuop is mispredicted. In this way, no penalty is paid if the end of the string is reached before finding the sought for relationship. It should be noted that if an event occurs during a string operation, the event handler reloads the Loop Counter in the MS with the current value in (E)CX before restarting the string operation.

Thus, an apparatus and method for handling string operations in a pipelined processor is described.

What is claimed is:

1. A method for performing a string operation in a pipelined processor, comprising the steps of:
    loading a memory with a first value specifying a length of a string corresponding to said string operation;
    issuing an instruction to a pipeline of said processor, said instruction computing a second value equal to said first value minus a pre-determined number of iterations to be performed on said string;
    issuing said pre-determined number of iterations to said pipeline;
    comparing said second value to zero after said instruction is executed in said pipeline;
    converting at least one of said pre-determined number of iterations that had been issued to said pipeline if said second value is less than zero;
    issuing an additional number of iterations to said pipeline if said second value is greater than zero;
    executing said pre-determined number of iterations that had been issued to said pipeline if said second value equals or is greater than zero.

2. The method of claim 1 further comprising the steps of:
    a) issuing one iteration to said pipeline in addition to said pre-determined number of iterations;
    b) decrementing said second value;
    c) determining whether said second value is equal to zero after said decrementing step;
    d) repeating steps a–c if said second value is not equal to zero.

3. The method of claim 2, wherein said converting step is comprised of the step of converting said at least one of said pre-determined number of iterations that had been issued to said pipeline into a NOP.

4. The method of claim 3 further comprising the step of jumping to a routine for terminating said string if said second value equals zero.

5. The method of claim 4, wherein said pipeline is comprised of at least eleven pipe stages.

6. The method of claim 5, wherein said issuing steps occur in a first pipe stage that is prior to a second pipe stage in which said instruction is executed.

7. The method of claim 4, wherein said pre-determined number is approximately seven.

8. In a pipelined processor, an apparatus for handling string operations, comprising:
    a register for storing a first value that specifies a length of a string corresponding to said string operation;
    an instruction sequencer coupled to said register for issuing an instruction to a pipeline of said processor, said instruction for computing a second value equal to said first value minus a pre-determined number of iterations to be performed on said string, wherein said instruction sequencer issues said pre-determined number of iterations to said pipeline after issuing said instruction;
    an execution unit coupled to said instruction sequencer for executing said instruction;
    a comparator coupled to said instruction sequencer for comparing said second value to zero after said instruction is executed, said execution unit canceling at least one of said pre-determined number of iterations that had been issued to said pipeline if said second value is less than zero.

9. The apparatus of claim 8, wherein said instruction sequencer issues an additional number of iterations to said pipeline if said second value is greater than zero.

10. The apparatus of claim 9, wherein said execution unit conditionally executes said pre-determined number of iterations that had been issued to said pipeline if said second value equals zero.

11. The apparatus of claim 10, wherein said instruction sequencer is comprised of a loop counter which is initially loaded with said second value, said loop counter determining whether issued iterations are to be conditionally executed and whether additional iterations are to be issued.

12. The apparatus of claim 11, wherein said loop counter is decremented if a first additional iteration is issued, said instruction sequencer issuing a second iteration if a loop counter value is greater than zero.

13. The apparatus of claim 12, wherein said execution unit cancels said at least one of said pre-determined number of iterations that had been issued by converting said iterations into NOPs.

14. The apparatus of claim 13 further comprising a jump execution unit for jumping to a routine that terminates said string if said second value equals zero.

15. The apparatus of claim 14, wherein said pipeline is comprised of eleven pipe stages.

16. The apparatus of claim 15, wherein said instruction sequencer operates in a first pipe stage that is prior to a second pipe stage in which said execution unit operates.

17. The apparatus of claim 14, wherein said predetermined number is approximately seven.

18. A pipelined processor, comprising:
    a memory means for storing a first value that specifies a length of a string corresponding to a string operation to be processed by said pipelined processor;
    an instruction sequencing means coupled to said memory means for issuing an instruction to a pipeline of said processor, said instruction for computing a second value equal to said first value minus a pre-determined number of iterations to be performed on said string, wherein said instruction sequencing means issues said pre-determined number of iterations to said pipeline after issuing said instruction;
    an executing means coupled to said instruction sequencing means for executing said instruction;
    a comparing means coupled to said instruction sequencing means for comparing said second value to zero after said instruction is executed, said executing means canceling at least one of said pre-determined number of iterations that had been issued to said pipeline if said second value is less than zero.

19. The pipelined processor of claim 18, wherein said instruction sequencing means issues an additional number of iterations to said pipeline if said second value is greater than zero.

20. The pipelined processor of claim 19, wherein said executing means conditionally executes said pre-determined number of iterations that had been issued to said pipeline if said second value equals zero.

21. The pipelined processor of claim 20, wherein said instruction sequencing means is comprised of a loop counting means which is initially loaded with said second value, said loop counting means determining whether issued iterations are to be conditionally executed and whether additional iterations are to be issued.

22. The pipelined processor of claim 21, wherein said loop counting means is decremented if a first additional iteration is issued, said instruction sequencing means issuing a second iteration if a loop counter value is greater than zero.

23. The pipelined processor of claim 22, wherein said executing means does not execute said at least one of said pre-determined number of iterations that had been issued by converting said iterations into NOPs.

24. The pipelined processor of claim 23 further comprising a means for jumping to a routine that terminates said string if said second value equals or is less than zero.

25. The pipelined processor of claim 24, wherein said pipeline is comprised of eleven pipe stages.

26. The pipelined processor of claim 25, wherein said instruction sequencing means operates in a first pipe stage that is prior to a second pipe stage in which said executing means operates.

27. The pipelined processor of claim 26, wherein said pre-determined number is approximately seven.

28. A computer system comprising:
a bus;
a main memory coupled to said bus for storing digital data;
a microprocessor coupled to said bus for processing said digital data in a pipeline, said microprocessor comprising:
a register for storing a first value that specifies a length of a string corresponding to said string operation;
an instruction sequencer coupled to said register for issuing an instruction to a pipeline of said processor, said instruction for computing a second value equal to said first value minus a pre-determined number of iterations to be performed on said string, wherein said instruction sequencer issues said pre-determined number of iterations to said pipeline after issuing said instruction;
an execution unit coupled to said instruction sequencer for executing said instruction;
a comparator coupled to said instruction sequencer for comparing said second value to zero after said instruction is executed, said execution unit canceling at least one of said pre-determined number of iterations that had been issued to said pipeline if said second value is less than zero.

29. The computer system of claim 28, wherein said instruction sequencer issues an additional number of iterations to said pipeline if said second value is greater than zero.

30. The computer system of claim 29, wherein said execution unit conditionally executes said pre-determined number of iterations that had been issued to said pipeline if said second value equals zero.

31. The computer system of claim 30, wherein said instruction sequencer is comprised of a loop counter which is initially loaded with said second value, said loop counter determining whether issued iterations are to be conditionally executed and whether additional iterations are to be issued.

32. The computer system of claim 31, wherein said loop counter is decremented if a first additional iteration is issued, said instruction sequencer issuing a second iteration if a loop counter value is greater than zero.

33. The computer system of claim 32, wherein said execution unit cancels said at least one of said pre-determined number of iterations that had been issued by converting said iterations into NOPs.

34. The computer system of claim 33 further comprising a jump execution unit for jumping to a routine that terminates said string if said second value equals zero.

35. The computer system of claim 34, wherein said pipeline is comprised of eleven pipe stages.

36. The computer system of claim 35, wherein said instruction sequencer operates in a first pipe stage that is prior to a second pipe stage in which said execution unit operates.

37. The computer system of claim 36, wherein said pre-determined number is approximately seven.

* * * * *

UNITED STATES PATENT AND TRADEMARK OFFICE
CERTIFICATE OF CORRECTION

PATENT NO.    : 5,404,473
DATED         : April 4, 1995
INVENTOR(S)   : Papworth et al.

It is certified that error appears in the above-identified patent and that said Letters Patent is hereby corrected as shown below:

In column 2 at line 61 delete "father" and insert --rather--

In column 9 at line 56 delete "swing" and insert --string--

In column 9 at line 60 delete "Swings" and insert --String --

In column 11 at line 9 delete "handier" and insert --handler--

Signed and Sealed this

Thirty-first Day of December, 1996

Attest:

BRUCE LEHMAN

Attesting Officer

Commissioner of Patents and Trademarks